(12) United States Patent
Hill

(10) Patent No.: US 6,507,607 B1
(45) Date of Patent: Jan. 14, 2003

(54) APPARATUS AND METHOD FOR RECOVERING A CLOCK SIGNAL FOR USE IN A PORTABLE DATA CARRIER

(75) Inventor: Michael John Hill, Vaud (CH)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/012,085

(22) Filed: Jan. 22, 1998

(30) Foreign Application Priority Data

Jan. 30, 1997 (GB) .............................................. 9701954

(51) Int. Cl.[7] ................................................ H04B 1/38
(52) U.S. Cl. ........................................ 375/219; 375/316
(58) Field of Search ................................ 375/219, 259, 375/316, 329; 455/571, 572

(56) References Cited

U.S. PATENT DOCUMENTS

| | | | | |
|---|---|---|---|---|
| 4,821,120 A | * | 4/1989 | Tomlinson | 348/727 |
| 5,453,747 A | | 9/1995 | D'Hont et al. | 342/42 |
| 5,519,729 A | * | 5/1996 | Jurisch et al. | 375/259 |
| 5,930,304 A | * | 7/1999 | Hollenbeck et al. | 375/316 |
| 5,952,922 A | * | 9/1999 | Shober | 340/572.4 |
| 5,998,978 A | * | 12/1999 | Connell et al. | 323/273 |
| 6,005,894 A | * | 12/1999 | Kumar | 375/270 |

FOREIGN PATENT DOCUMENTS

| | | | |
|---|---|---|---|
| EP | 0 287 175 A1 | 10/1988 | G07C/9/00 |
| EP | 0 627 832 A1 | 4/1994 | H04L/27/22 |
| EP | 0 858 045 A3 | 4/2000 | G06K/7/00 |
| WO | WO 92/09175 | 5/1992 | H04Q/1/00 |

OTHER PUBLICATIONS

Applicant's translation of Applicant's reference BK. Laid Open No. 60–179891, Sep. 13, 1985, Japan.

* cited by examiner

Primary Examiner—Young T. Tse

(57) ABSTRACT

A portable data carrier includes a radio frequency (RF) receiving circuit tuned to receive power signals on a carrier frequency, $f_c$. The portable data carrier further includes a processor that uses a clock signal for operation thereof. A method of recovering the clock signal includes the steps of receiving timing information on a first sub-carrier frequency, $f_s1$, that is offset from $f_c$ by a predetermined frequency. The timing information is then demodulated and the clock signal is extracted therefrom.

13 Claims, 3 Drawing Sheets

APPARATUS AND METHOD FOR RECOVERING A CLOCK SIGNAL FOR USE IN A PORTABLE DATA CARRIER

FIELD OF THE INVENTION

The present invention relates generally to a portable data carrier designed for use in a contactless mode, and in particular to a method and apparatus for regulating power delivered to such a portable data carrier.

BACKGROUND OF THE INVENTION

Portable data carriers (e.g., smart cards or chip cards are known to include a plastic substrate in which a semiconductor device (i.e., integrated circuit—IC) is disposed for retaining digital data. This digital data may constitute program instructions, user information, or any combination thereof. Moreover, these smart cards are known to be operational in a contacted mode, whereby an array of contact points disposed on the plastic substrate and interconnected with the semiconductor device is used to exchange electrical signals between the chip card an external card reader, or terminal. Similarly, there exists smart cards that operate in a contactless mode, whereby a radio frequency (RF) receiving circuit is employed to exchange data between the card and a card terminal. That is, the card need not come into physical contact with the card terminal in order to exchange data therewith, but rather must simply be placed within a predetermined range of the terminal.

Additionally, there exist smart cards that are alternatively operational in either a contacted mode or a contactless mode. Such cards are equipped with both RF receiving circuitry (for contactless operations) as well as an array of contact pads (for contacted operations). These smart cards are commonly referred to as combination cards, or combi-cards. It should be noted that in both the contact-only card and the combi-card arrangements, the array of contact pads typically conform to the ISO Standard 7816, which standard is incorporated herein by reference.

One of the problems of today's contactless smart card applications is the limited amount of information that can be modulated onto the carrier frequency. Indeed, some applications prohibit any modulation of the carrier frequency, thereby requiring another means for extracting transmitted information signals, other than the power signal transmitted on the carrier frequency, $f_c$. Of course, there is a need for a transport of data signals as well as a clock signal that is to be used by the processing element of the smart card.

Prior art applications have tried to solve this problems using two-frequency systems, whereby the power signal was transmitted on a first frequency, and information (e.g. data signals and timing information) were transmitted on a second frequency. This implementation, which required additional circuitry on board the smart card where space is limited, resulted in a complex and costly solution. That is, because the discrete components required to receive RF signals from a terminal/reader, account for a great deal of the cost and complexity of a smart card system, adding another discrete receiving circuit to the card substantially increases the cost.

Accordingly, there exists a need for a method and apparatus for recovering a clock signal that is not constrained by the shortcomings of the prior art. In particular, a smart card apparatus that was able to reliably receive information without using the carrier frequency, and without adding substantial cost to the manufacture of the card, would be an improvement of the prior art.

DETAILED DESCRIPTION OF A PREFERRED EMBODIMENT

The present invention encompasses a portable data carrier (e.g. a smart card) that includes a radio frequency (RF) receiving circuit that is tuned to receive power signals on a carrier frequency, $f_c$. The smart card also includes a processing element requiring a clock-signal that is generated according to the present invention. An information signal is received on a first sub-carrier frequency varying in-frequency from $f_c$ by a predetermined amount $f_s1$. The information signal includes timing information which is demodulated by the smart card and used to extract the clock signal for use by the processing element thereof. In this manner, the present invention solves the problems of the prior art by providing a cost effective technique for receiving the timing information from which a clock signal can be generated. Moreover, the carrier frequency need not be modulated to extract the clock signal.

Figure 1:
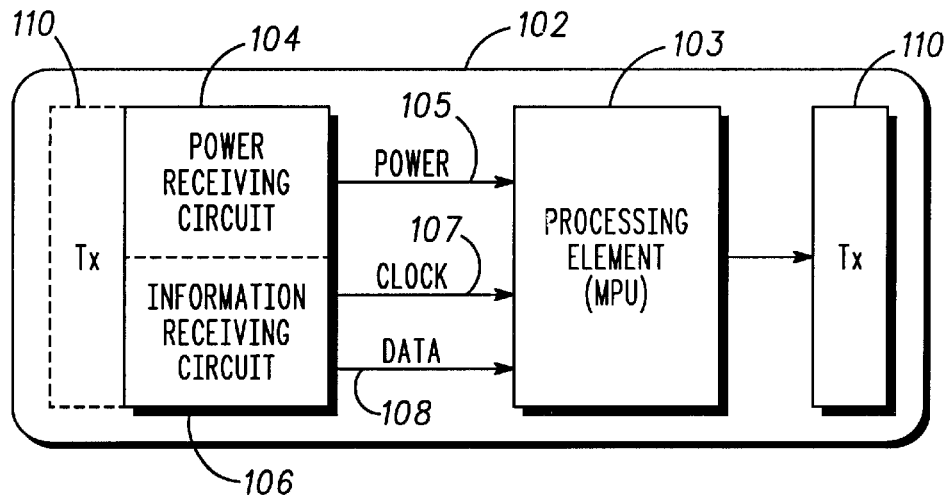
FIG. 1 shows a simplified block diagram of a smart card, in accordance with the present invention.

The present invention can be better understood with reference to FIGS. 1–6. FIG. 1 shows a simplified block diagram of a smart card 100, according to the present invention. A smart card substrate 102 has disposed therein a processing element (MPU) 103. Smart card 100 further includes a power receiving circuit 104, which serves to extract the power signal 105 from the carrier frequency generated by a terminal/reader. A separate information receiving circuit 106 comprises a sub-carrier demodulator, as later described. A clock signal 107 and a data signal 108 are both extracted from the sub-carrier frequency and inputted to the processing element 103 for use thereby. A transmitting circuit 110 is shown here as being coupled to the processing element 103 for down-link (card to terminal) transmissions. (In practice, however, the down-link transmitter section is often embodied in the up-link circuitry— i.e., they share a common antenna arrangement.) As will be later described with reference to FIG. 4, the down-link transmissions may or may not be sent using the same sub-carrier frequency from which the clock signal is derived.

Figure 2:
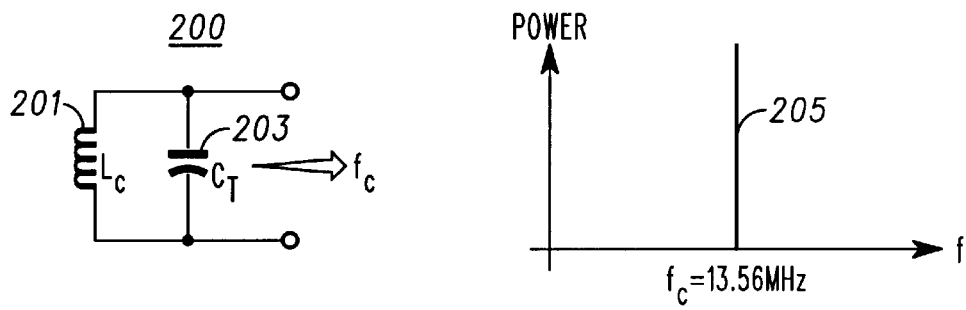
FIG. 2 shows a simplified schematic diagram showing how a carrier frequency is established, and a diagram showing a power spectrum response at the carrier frequency.

FIG. 2 shows a simplified schematic diagram 200 representing the discrete components used to establish the carrier frequency in the contactless mode. That is, the values of $L_a$ and $C_t$ determine the carrier frequency that is used by the terminal/reader for up-link transmissions, and likewise represents an equivalent circuit for the power receiving circuit 104 shown in FIG. 1. Also shown in FIG. 2 is a diagram 204 depicting the power spectrum of the carrier frequency, $f_c$, according to the present invention. In a preferred embodiment, the carrier frequency selected is 13.56 MHz, which conforms to the ISO International Standard. It should be well understood by those skilled in the art that power curve 205 is sufficient to carry the power signal from the terminal/reader to the smart card for use thereby.

Figure 3:
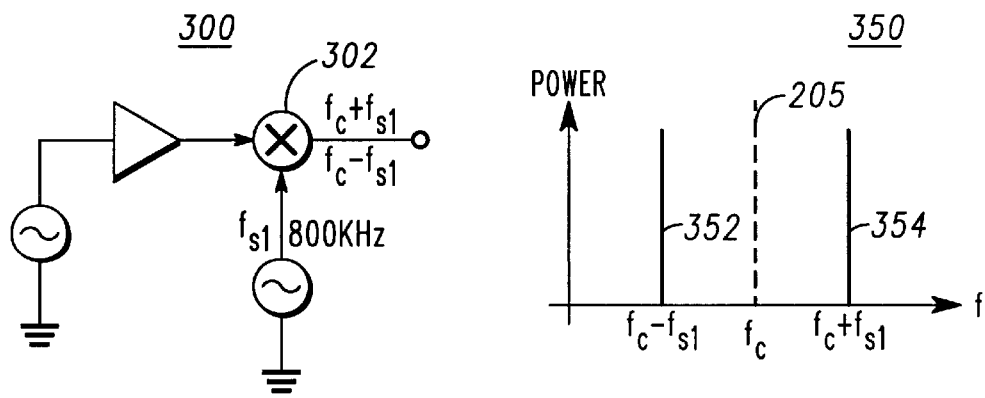
FIG. 3 shows a modulation arrangement, and a diagram showing the power spectrum of the modulated output received at the smart card, in accordance with the present invention.

FIG. 3 shows a simplified schematic diagram 300 depicting how the first sub-carrier frequency is generated, according to the present invention. The carrier frequency, $f_c$, is inputted to a mixer 302, which serves as a modulator for modulating the carrier frequency by an amount equal to $f_s1$. That is, a first predetermined frequency offset $f_s1$ is injected into the mixer 302, which then outputs a pair of sub-carrier signals ($f_c+f_s1$, $f_c-f_s1$) into an amplifier (not shown) for up-link transmissions (e.g., reader to card). In a preferred embodiment, the first predetermined frequency, $f_s1$, is selected at approximately 800 kHz, resulting in sub-carrier frequencies of 12.76 MHz and 14.36 MHz, respectively. These values are chosen for reasons described more fully with reference to FIG. 4. In a preferred embodiment, the timing signal used by the processor element is first stabilized, using conventional phase-locked loop (PLL) techniques, and then multiplied. In a preferred embodiment, the stable reference signal (outputted from the PLL and being substantially equal to the sub-carrier offset frequency) is multiplied by three (3), resulting in a stable 2.4 MHz clock signal.

FIG. 3 also shows a power diagram 350 that reflects the power spectrum for the plurality of signals, namely the carrier frequency and its sub-carrier components. As shown, power curve 205 lies in the center of the power curves 352, 354 associated with the first respective sub-carrier frequency $f_c+f_s1$ or $f_c-f_s1$. As mentioned earlier, both sub-carrier frequencies carry the information signals needed by the processing element 103 shown in FIG. 1 (thus, one of them may be filtered out without loss of information). Transmitted information is extracted at the card by demodulating the sub-carrier frequency (or frequency pair), using well-known demodulation techniques.

As indicated, the sub-carrier frequencies are modulated using an amplitude modulation scheme. However, the skilled artisan will recognize that phase modulation is equally suitable for such an arrangement, and is simply a matter of design choice depending on system specifications. It is important to note that the sub-carrier frequency is not an integer harmonic of the carrier frequency, but rather comprises a pre-determined offset $f_s1$ selected for optimum performance to reliably capture information signals. In one embodiment of the present invention, the sub-carrier frequency can be used both in the uplink (receiving) mode and the downlink (transmitting) mode. Again, this is a matter of design choice, and may be altered as later described.

Figure 6:
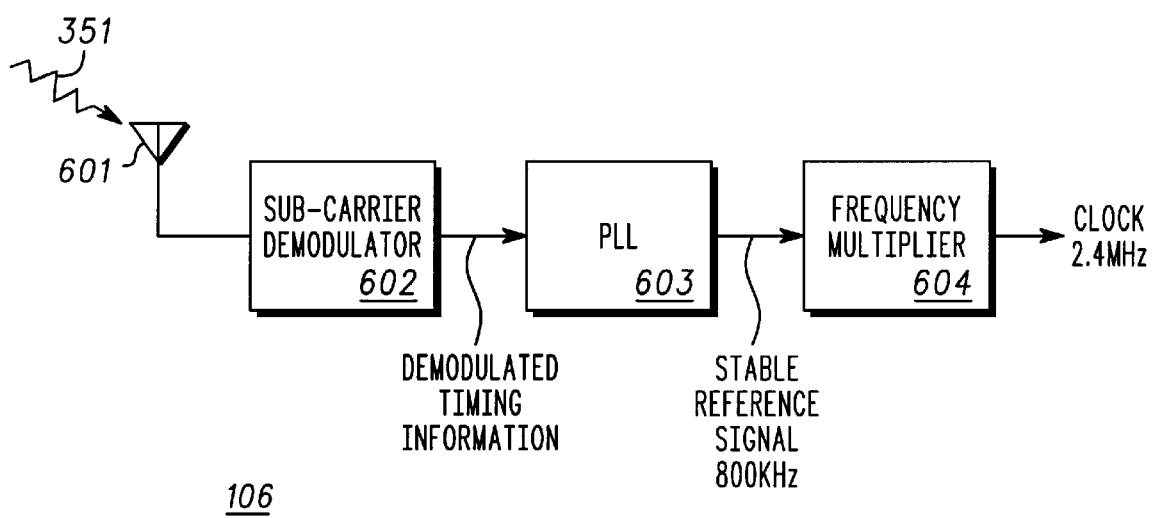
FIG. 6 illustrates in block diagram form the information receiving circuit of FIG. 1.

FIG. 6 illustrates in block diagram form information receiving circuit 106 of FIG. 1. Information receiving circuit 106 includes an antenna 601 that receives an RF uplink signal having power spectrum 351 and indicated by the same reference number. To extract the information and timing signals, uplink signal 351 is demodulated in a sub-carrier demodulator 602. The 800 kHz clock signal is then stabilized in a phase locked loop (PLL) 603, and multiplied in a frequency multiplier 604 to provide the CLOCK signal at the desired frequency of 2.4 MHz.

Once the sub-carrier frequency is demodulated to extract the information signals, the processing element 103 proceeds to transfer data onto a multitude of buses and an internal registers bus (not shown) for use by the smart card 100. It is well known that such data transfers generate a convoluted noise signal, which is attributable to the data being switched and is commonly referred to as switching noise. The switching noise generated by the processing element 103 presents problems with the reception and transmission of information signals to and from the smart card 100. In accordance with a preferred embodiment of the invention, the sub-carrier frequency (or frequencies) can be advantageously selected to avoid the problems brought on by this switching noise signal, as next described.

Figure 4:
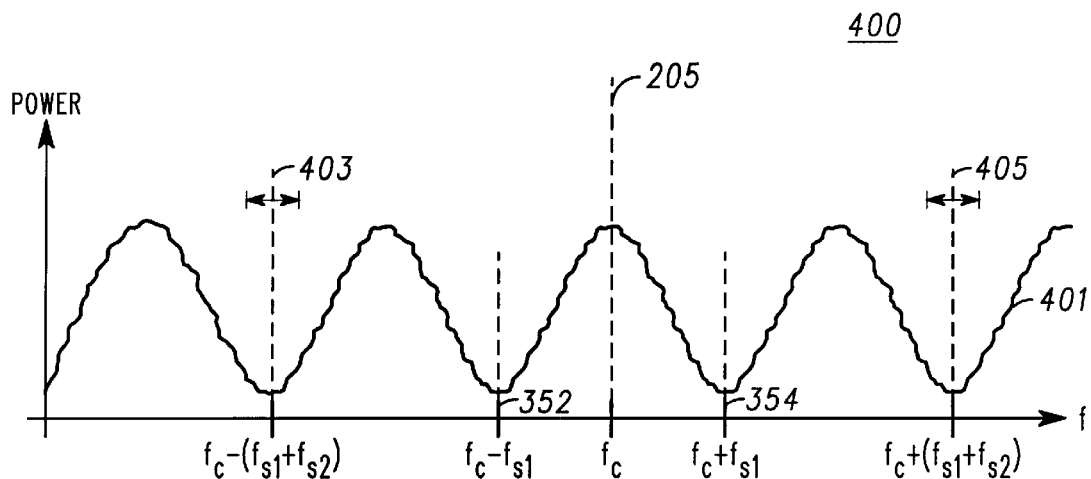
FIG. 4 shows a diagram depicting the power spectrum of a carrier frequency and plurality of sub-carrier frequencies, selectively disposed about a noise signal, in accordance with the present invention.

FIG. 4 shows a power spectrum curve 400 that includes a switching noise signal 401 and indicates the relative positions of the carrier and sub-carrier frequency signals, in accordance with the present invention. It should be noted that the switching noise signal 401 shown here is exaggerated in amplitude for purposes of explanation, but can in fact be characterized as being substantially periodic, as shown. Because of this periodic characteristic, the sub-carrier frequencies ($f_c+f_s1$, $f_c-f_s1$) can be selected so as to advantageously coincide with quiet zones of the switching noise signal 401, as shown. That is, according to the present invention, the first predetermined frequency offset $f_s1$ can be chosen to be within a pre-determined range of a minimum amplitude of the switching noise signal 401. In this manner, the information carried on the sub-carrier frequency is readily detectable using amplitude and/or phase modulation techniques. By contrast, a sub-carrier frequency chosen substantially near a peak amplitude of the switching noise signal 401 would result in poor demodulation performance as a result of the conflicting noise signal 401 generated by the processing element 103.

In addition to selecting a first predetermined frequency offset, $f_s1$, for the uplink transmission, a second predetermined frequency offset, $f_s2$, can be chosen for the downlink transmissions. By way of example, frequencies 403 and 405 are selected to coincide in frequency with a second pair of quiet zones for the switching noise signal 401, as shown. As with the first sub-carrier frequency signal, the second sub-carrier frequency signal can be either phase modulated (as shown) or amplitude modulated, depending on the system requirements. (Note that the power response of the downlink sub-carrier frequency signals, 403, 405 appear to have a larger amplitude than their up-link counterparts. This is a result of the power spectrum curve being drawn from the perspective of the smart card, and is not a reflection of any significant power difference between the up-link and down-link transmissions.)

In a preferred embodiment, the second predetermined frequency offset, $f_s2$, is selected to be an integer product of the first predetermined frequency offset, $f_s1$. Of course, one skilled in the art will recognize that this is a result of the periodic nature of the switching noise signal 401. That is, once the switching noise signal is characterized as having a particular period, the first predetermined frequency offset is chosen to be one-half of that period (assuming it's maximum amplitude coincides with $f_c$, as shown). Likewise, the second sub-carrier frequency is selected to be one or more full cycles away from the first sub-carrier frequency, as shown. In this manner, system performance (i.e., reception and transmission) can be optimized even in the presence of undesirable switching noise.

Figure 5:
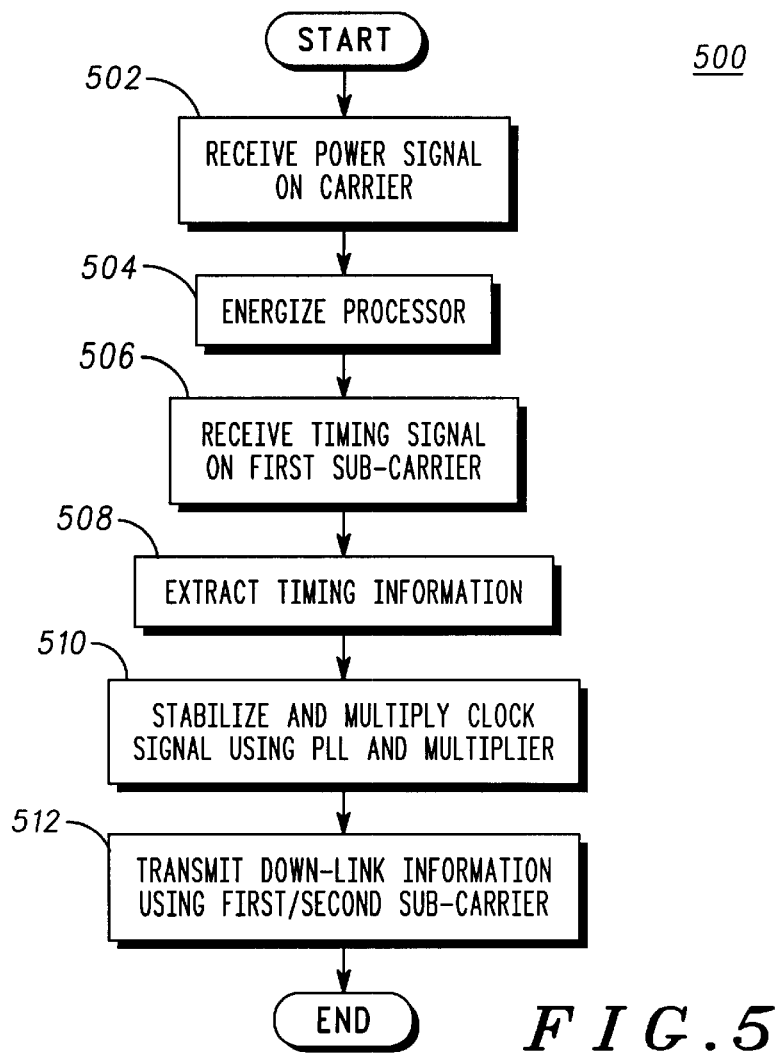
FIG. 5 shows a flow diagram depicting operation of a smart card, in accordance with the present invention.

FIG. 5 shows a flow diagram 500 depicting operation of a contactless smart card, according to the present invention. Once the card enters into the magnetic field of the terminal/reader, a power signal is received (502) and the processing element 103 is energized (504). Meanwhile, the timing signal is received (506) on the first sub-carrier frequency, as earlier described. The timing information is then demodulated (508) using conventional demodulating circuitry, and the clock signal is extracted therefrom. At this point, the processing element 103 is able to properly operate, switching data, manipulating stored data records, etc. In a preferred embodiment, the interim clock signal (i.e., 800 kHz) is stabilized (510) using a PLL and multiplied to produce a stable 2.4 MHz clock for use by the processor element. Lastly, processed data can be transmitted (512) on a downlink sub-channel using either the first or second sub-carrier frequency, as earlier described.

In the foregoing manner, the present invention provides a method for reliably recovering a clock signal even in the presence of unavoidable switching noise. Moreover, the carrier frequency need not be modulated to recover the clock signal or other data signals, as was done in prior art clock recovery schemes.

What is claimed is:

1. In a portable data carrier that includes a radio frequency (RF) receiving circuit tuned to receive power signals on a carrier frequency, $f_c$, the portable data carrier further including a processing element that requires a clock signal for operation thereof, a method comprising the steps of:

powering the processing element using the power signals;

receiving an information signal on a first sub-carrier frequency that is offset from $f_c$ by a first predetermined frequency offset, $f_s1$, wherein the information signal includes timing information;

demodulating the timing information received, thereby producing demodulated timing information; and generating the clock signal from the demodulated timing information.

2. The method of claim 1, wherein the step of generating comprises the step of inputting the demodulated timing information to a phase locked loop (PLL) circuit, the PLL circuit produces a stable reference signal.

3. The method of claim 2, further comprising the step of multiplying the stable reference signal by an integer multiple to produce the clock signal for use by the processing element.

4. The method of claim 1, wherein the first sub-carrier frequency is selected to be a non-integer harmonic of the clock signal.

5. The method of claim 1, wherein the processing element switches a data signal during operation, thereby producing a switching noise data signal that includes a quiet zone, the method further comprising the step of selecting $f_s1$ such that the first sub-carrier frequency falls substantially within a predetermined range of the quiet zone.

6. The method of claim 1, wherein an uplink (terminal to portable data carrier) information signal is transmitted on the first sub-carrier frequency, and a downlink (portable data carrier to terminal) information signal is transmitted on a second sub-carrier frequency that is offset from $f_c$ by an amount equal to the sum of the first predetermined frequency offset $f_s1$ and a second predetermined frequency offset $f_s2$, wherein $f_s2$ comprises an integer multiple of $f_s1$.

7. A portable data carrier, comprising:

a first receiving circuit tuned to receive power signals on a carrier frequency $f_c$;

a processing element, having a power supply voltage terminal operably coupled to the first receiving circuit for receiving the power signals thereon, that requires a clock signal for operation thereof;

a second receiving circuit, operably coupled to the first receiving circuit and tuned to receive information signals on a first sub-carrier frequency that is offset from $f_c$ by a first predetermined frequency offset, $f_s1$, the second receiving circuit providing both the clock signal and a plurality of data signals to the processing element.

8. The portable data carrier of claim 7, further comprising a transmitting circuit tuned to transmit the data signals on a second sub-carrier frequency that is offset from $f_c$ by an amount equal to the sum of the first predetermined frequency offset $f_s1$ and a second predetermined frequency offset $f_s2$, wherein $f_s2$ comprises an integer multiple of $f_s1$.

9. The portable data carrier of claim 8, wherein the second receiving circuitry comprises a phase locked loop circuit and a multiplier.

10. In a portable data carrier comprising a processing element for processing a data signal, the processing element powered by a first power supply voltage and operable in response to a clock signal, a method comprising the steps of:

receiving a modulated signal;

forming the first power supply voltage from energy in a carrier frequency of the modulated signal;

generating the clock signal in response to a sub-carrier frequency that is offset from a carrier frequency, $f_c$, by a predetermined offset, $f_s1$, of the modulated signal; and recovering the data signal by demodulating a portion of the modulated signal at the sub-carrier frequency down to baseband.

11. The method of claim 10 wherein the step of receiving the modulated signal comprises the step of receiving the modulated signal using an antenna.

12. The method of claim 10 wherein the step of generating the clock signal comprises the step of generating the clock signal in response to a difference in frequency between the carrier frequency and the sub-carrier frequency.

13. The method of claim 10 wherein the step of generating the clock signal further comprises the step of generating the clock signal using a phase locked loop that uses the difference in frequency between the carrier frequency and the sub-carrier frequency as a reference frequency.

* * * * *